(12) United States Patent
Nyholm et al.

(10) Patent No.: US 9,748,999 B2
(45) Date of Patent: Aug. 29, 2017

(54) CASE FOR A TABLET SHAPED DEVICE

(71) Applicant: STM Management Pty Ltd, Alexandria NSW (AU)

(72) Inventors: Ethan Nyholm, North Bondi NSW (AU); Cambell Smyth, Highgate Hill QLD (AU)

(73) Assignee: STM MANAGEMENT PTY LTD, Alexandria NSW (AU)

( * ) Notice: Subject to any disclaimer, the term of this patent is extended or adjusted under 35 U.S.C. 154(b) by 0 days.

(21) Appl. No.: 15/199,515

(22) Filed: Jun. 30, 2016

(65) Prior Publication Data
US 2017/0005687 A1 Jan. 5, 2017

(30) Foreign Application Priority Data
Jun. 30, 2015 (AU) ................. 2015902538

(51) Int. Cl.
| | | |
|---|---|---|
| *H04B 1/3888* | (2015.01) | |
| *A45C 11/00* | (2006.01) | |
| *A45C 13/02* | (2006.01) | |
| *A45C 13/10* | (2006.01) | |
| *A45C 13/00* | (2006.01) | |
| *F16M 1/00* | (2006.01) | |
| *F16B 1/00* | (2006.01) | |

(52) U.S. Cl.
CPC ............ *H04B 1/3888* (2013.01); *A45C 11/00* (2013.01); *A45C 13/005* (2013.01); *A45C 13/02* (2013.01); *A45C 13/1069* (2013.01); *F16M 1/00* (2013.01); *A45C 2011/003* (2013.01); *A45C 2200/15* (2013.01); *F16B 1/00* (2013.01); *F16B 2001/0035* (2013.01)

(58) Field of Classification Search
CPC .. H04B 1/3888; A45C 13/1069; A45C 13/002
See application file for complete search history.

(56) References Cited

U.S. PATENT DOCUMENTS

| | | | |
|---|---|---|---|
| 6,301,101 B1 * | 10/2001 | Anzai ................... | G06F 1/1626 248/688 |
| 9,226,567 B2 * | 1/2016 | Potter ...................... | A45F 5/10 |
| 2015/0263776 A1 * | 9/2015 | Shyu ................... | A45C 13/002 455/575.8 |

* cited by examiner

*Primary Examiner* — Tuan Pham
(74) *Attorney, Agent, or Firm* — Christensen, Fonder, Dardi & Herbert PLLC

(57) ABSTRACT

A case for a tablet shaped device. The case comprises a body comprising a first face and a second face. The first face has a tablet shaped device receiving area. The body comprises a stylus holder for holding a stylus at the second face. The body comprises a collapsible stand attached to the body. The collapsible stand defines a space in which the stylus, when so held, is disposed when the collapsible stand is collapsed.

6 Claims, 6 Drawing Sheets

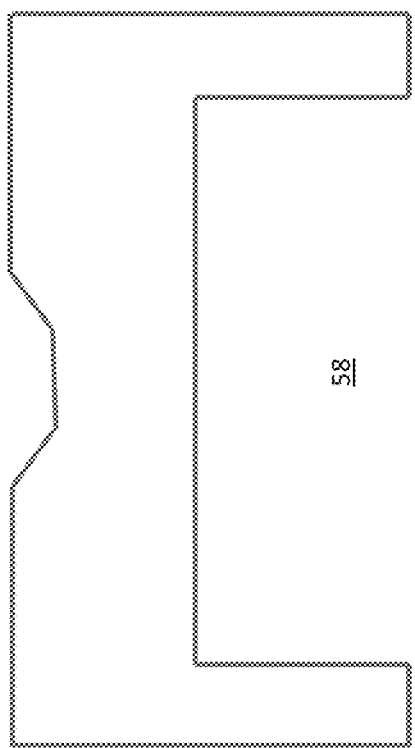

CASE FOR A TABLET SHAPED DEVICE

RELATED APPLICATIONS

The present application claims priority to Australian Provisional Patent Application No. 2015902538, filed Jun. 30, 2015, the disclosure of which is hereby incorporated by reference herein in its entirety.

FIELD OF THE INVENTION

The disclosure herein generally relates to a case for a tablet shaped device.

BACKGROUND

Cases for tablet shaped devices, examples of which include the APPLE IPAD, SAMSUNG GALAXY TAB, smartphones like the APPLE IPHONE, and some personal digital assistants, are commercially available.

The commercially available cases for tablet shaped devices may not meet some of the needs of consumers.

SUMMARY

Disclosed herein is a case for a tablet shaped device. The case comprises a body comprising a first face and a second face. The first face has a tablet shaped device receiving area. The body comprises a stylus holder for holding a stylus at the second face. The body comprises a collapsible stand attached to the body. The collapsible stand defines a space in which the stylus, when so held, is disposed when the collapsible stand is collapsed.

In the context of the present application, the term stylus encompasses a hand-held tool used by a user to interact with a touch sensitive area (for example a touch sensitive screen) of the tablet shaped device. A stylus may, but not necessarily, comprise an elongated shaft having opposite ends and a touch sensitive area interaction point at least one of the opposite ends.

In an embodiment, the collapsible stand has an aperture in which the stylus, when so held, is disposed when the collapsible stand is collapsed.

In an embodiment, the collapsible stand is at the second face. The collapsible stand may be attached to the second face.

In an embodiment, the stylus holder comprises a groove for receiving the stylus. The groove may be formed in the second face.

In an embodiment, the stylus holder comprises a loop for receiving the stylus. The collapsible stand and the loop are relatively disposed such that the loop is constricted by the collapsible stand when collapsed. This may cause the loop to constrict the stylus when so received. A portion of the collapsible stand may press the loop inwardly when the collapsible stand 22 is collapsed to constrict the loop. The portion of the collapsible stand may press the loop inwardly when the collapsible stand is collapsed. Pressing the loop inwardly may tension the loop.

An embodiment comprises at least one support. The at least one support may be configured to support the stylus holder above a case bearing surface. The at least one support may extend outwardly from at least one of the collapsible stand and the second face. The at least one support may be attached to the distal edge of the collapsible stand. The support may be in the form of a foot.

In an embodiment, a distal edge of the collapsible stand comprises a slip-resistant material.

In an embodiment, the collapsible stand and the body are magnetically attracted to each other. The magnetic attraction may fasten the collapsible stand at the second face when collapsed. Any of the various features of the above disclosure, and of the various features of the embodiments described below, can be combined as suitable and desired.

BRIEF DESCRIPTION OF THE FIGURES

Embodiments will now be described by way of example only with reference to the accompanying figures in which:

FIG. 7 shows an elevational view of an alternative example of a collapsible stand for the case for a tablet computer of FIGS. 1-6.

DETAILED DESCRIPTION

Figure 1:
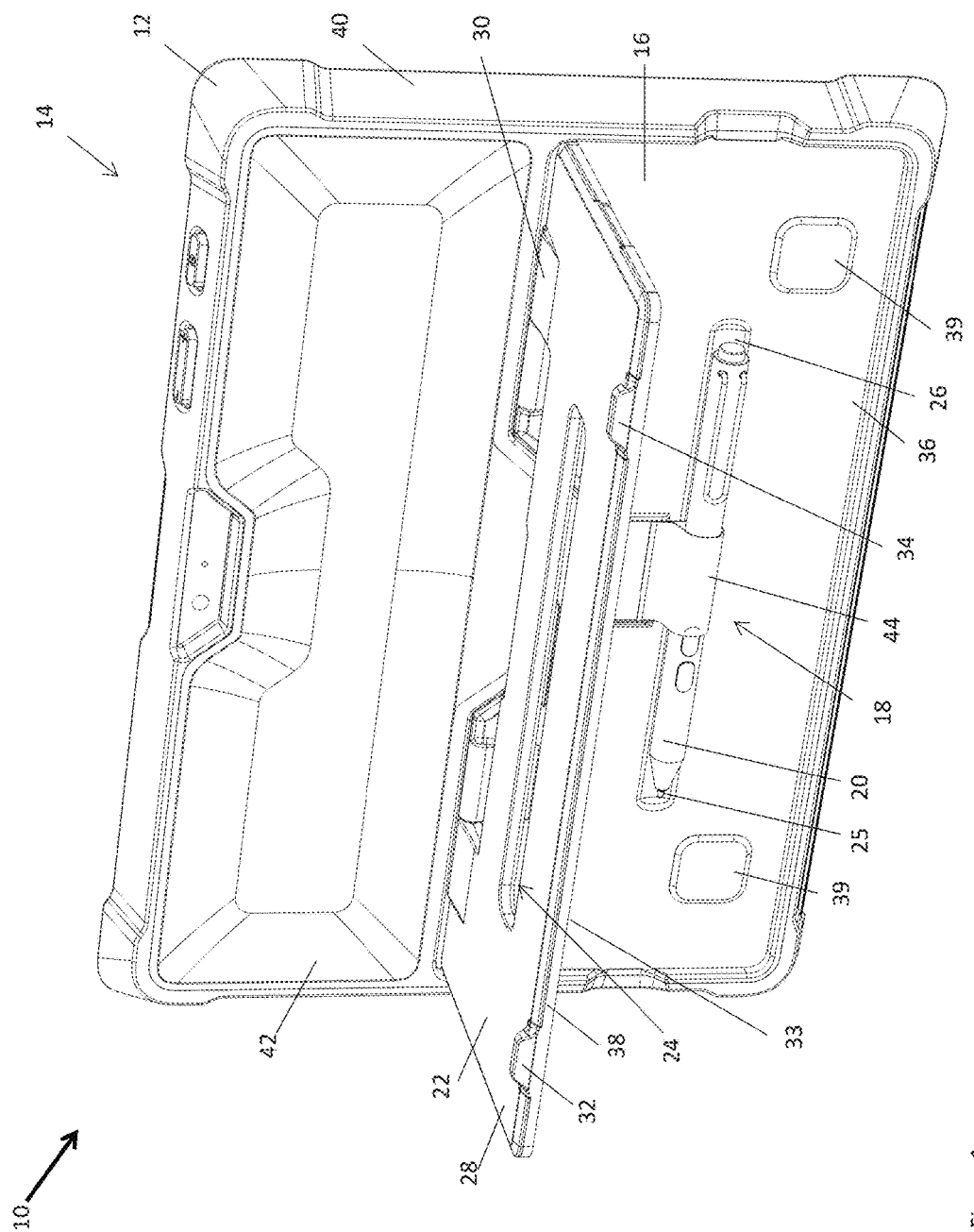
FIG. 1 shows a perspective rear view of a case for a table shaped device with a collapsible stand in an extended configuration.
Figure 2:
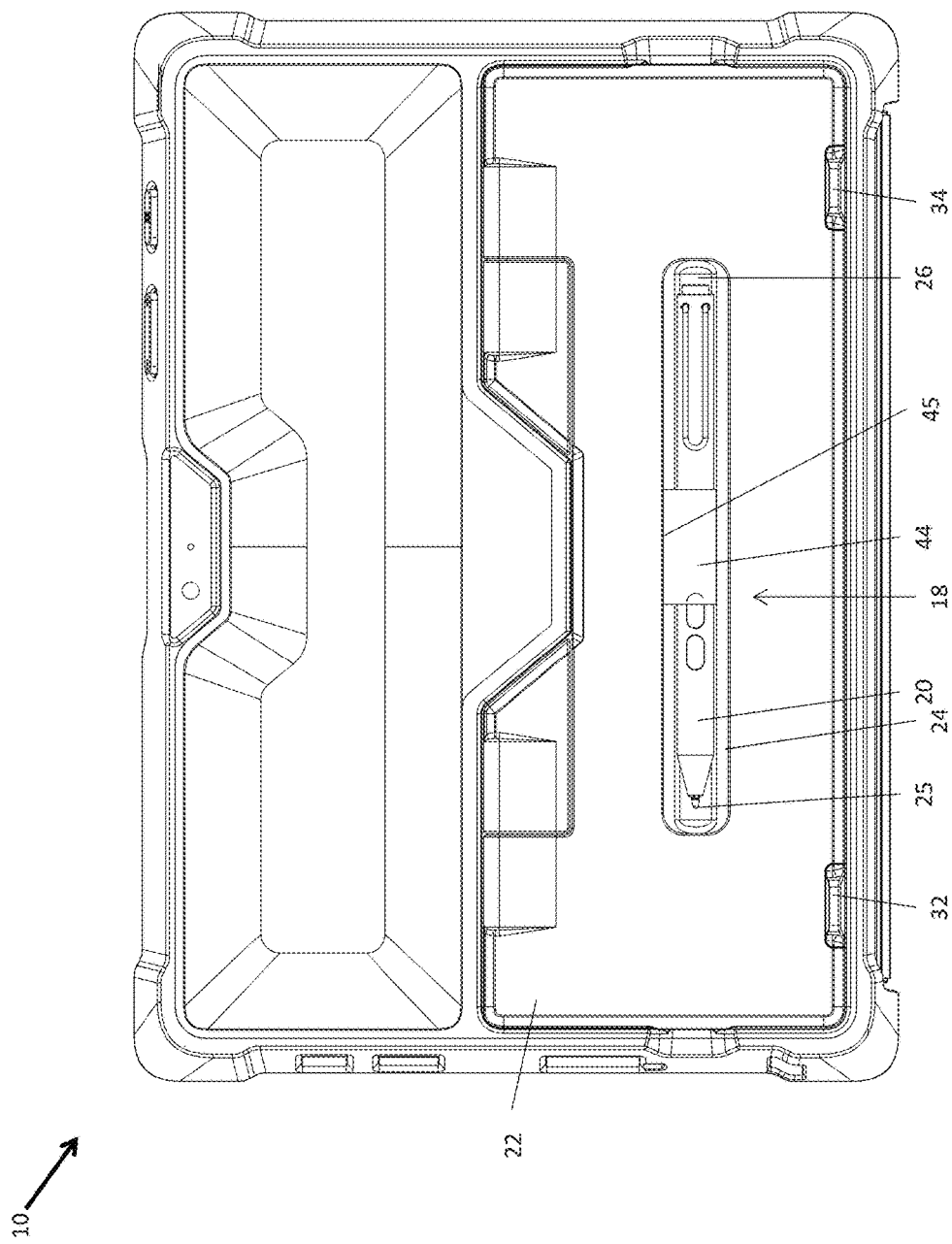
FIG. 2 shows a elevational rear view of the case of FIG. 1 with the collapsible stand collapsed.
Figure 4:
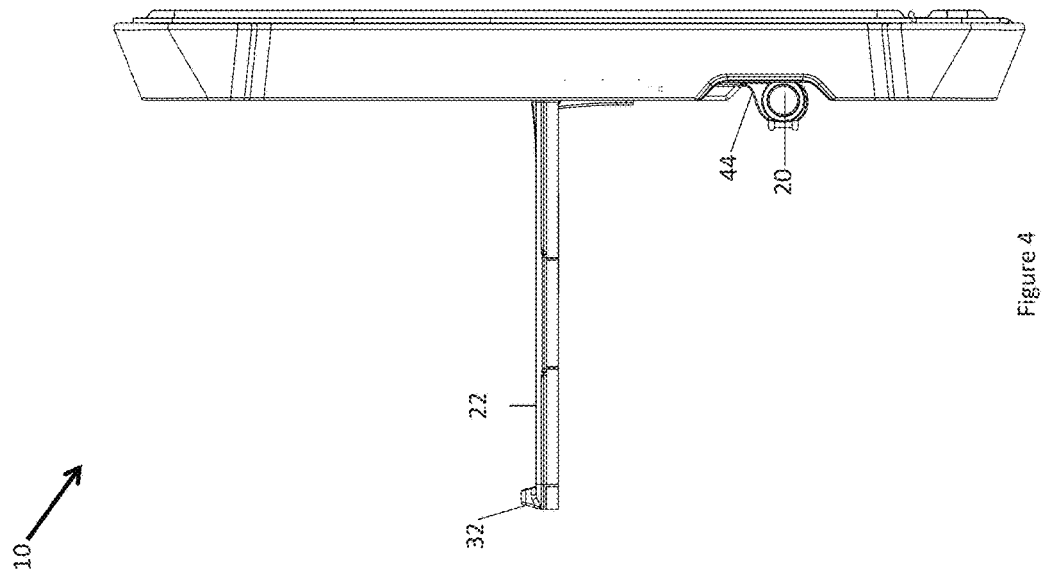
FIG. 4 shows a side elevational view of the case of FIG. 1 with the collapsible stand in the extended configuration.
Figure 3:
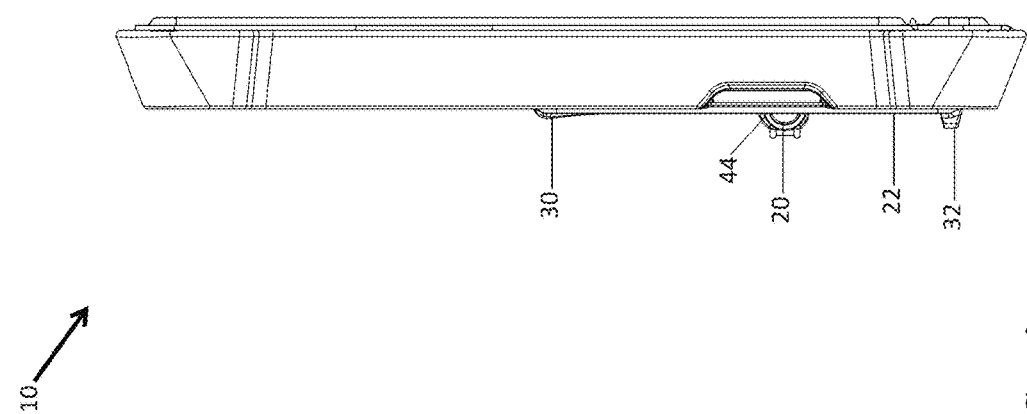
FIG. 3 shows a side elevational view of the case of FIG. 1 with the collapsible stand in the collapsed configuration.

FIG. 1 shows an embodiment of a case for a tablet shaped device 13, the case being generally indicated by the numeral 10. The case 10 has a body 12. The body has a first face 14. The first face 14 has a tablet shaped device receiving area. The body 12 also has a second face 16. The case has a stylus holder 18 for holding a stylus 20 at the second face 16. The case 10 has a collapsible stand 22 that is attached to the body 12 (in this but not all embodiments attached to the second face 16). FIG. 1 shows the collapsible stand 22 in an extended position. FIG. 2 shows the collapsible stand 22 collapsed. The collapsible stand 22 defines a space 24. As shown in FIG. 2, the stylus 20 when held by the stylus holder 18 is disposed in the space 24 when the collapsible stand 22 is collapsed. In the embodiment of FIGS. 1-6, but not all embodiments, the space 24 in the form of an aperture 24.

The stylus 20 may be easily removed from the stylus holder 18 via the aperture 24 when the collapsible stand 22 is closed. Removal of the stylus 20 through the aperture 24 may be easier and more convenient then requiring that the stand be opened for removal of the stylus, especially when the stand cannot be folded all the way back. A case 10 with the stylus holder 18 at the second face 16 may have smaller dimensions than a case with a stylus holder at the side of the case 10. A stylus 20 attached to the second face 16 may be less likely to snag when inserted into a bag or sleeve then a stylus 20 attached to a side of a case.

The first face 14 and the second face 16 are on opposite sides of the body 12. The stylus holder 18 has a groove 26 formed in the second face 16. The groove 26 is for receiving the stylus 20. Consequently, the stylus 20 is housed at least in part within the body 12 of the case 10. In the case of a relatively thin stylus 20, the stylus 20 may be housed wholly within the groove 26. Generally, but not necessarily, the stylus 20 is relatively thick and is not wholly housed within the groove 26. Nevertheless, the partial housing of the stylus 20 within the groove 26 may increase the security of the stylus 20, reduce the possibility of the stylus 20 being snagged, and reduce the chance of a damaging impact to the stylus 20. In the present but not all embodiments, the groove is configured such that the point 25 of the stylus 20 is within the groove 26 when the stylus 20 is received thereby. This may reduce the chance of point 25 catching on, for example, clothing.

When the collapsible stand 22 is collapsed, a portion of the stylus 20 that extends outside of the body 12 is disposed in the aperture 24. This enables the stand 22 to be collapsed without interference from the portion of the stylus 20 that extends outside of the body 12. Another embodiment does not have a groove 26. The stylus 20 is held at a flat surface portion of the second face 14. In this other embodiment the aperture also prevents interference of the stylus 20 with the stand 22 to enable the stand to be collapsed.

In the present embodiment, the collapsible stand 22 comprises a plate 28. The collapsible stand 22 also has at least one hinge 30, in the present embodiment two hinges that are respectively adjacent opposite ends of the collapsible stand 28. The at least one hinge 30 attaches the plate 28 to the second face 16. The hinge 30 is operable such that the plate 28 can be swung outwardly from the second face 16 and swung into the second face 16. The at least one hinge 30 in this but not all embodiments has a plurality of angular configurations wherein the at least one hinge 30 resists being reconfigured from any one of the plurality of angular configurations to any other one of the plurality of angular configurations. Abutting hinge portions of the at least one hinge 30 have a plurality of cooperating structures in the form of depressions and protrusions for locking the at least one hinge 30 in any one of the plurality of angular configurations. In the present embodiment the plurality of depressions comprise radial grooves and the plurality of protrusions comprise radial ribs configured to be received by the plurality of groves. The depressions and protrusions may alternatively comprise cavities and bulges, or generally have any suitable configuration.

In an alternative embodiment the stand 22 comprises a frame alternative or additional to the plate 28. In this alternative embodiment the space or aperture 24 may comprise the space within the frame. The frame may comprise, for example, bent wire or a molded polymer frame. The frame may generally have any suitable construction. The plate 28 may generally be more sturdy than a molded polymer frame. The plate 28 may be used in applications where rough treatment may be expected, for example by school children.

The case 10 has at least one support, in this embodiment two supports 32 and 34. The at least one support 32, 34 is configured to support the stylus holder above a case bearing surface, for example a table or bench that the case 10 may be lying on. The at least one support 32,34 is in the form of a foot, however it may be in alternative embodiments in the form of a strip or generally of any suitable form. The foot may be round, rectangular or generally have any suitable configuration. The at least one support 32, 34 extends outwardly from the collapsible stand 22. The at least one support 32, 34, in this but not all embodiments, is attached to the distal edge 33 of the collapsible stand 22, and extends outwardly thereof out of the plane of the plate 28. In use the at least one support 32, 34 is in contact with the case bearing surface to define a space between the case bearing surface and the body 12 for the stylus. This may improve the stability of the case 10 while it is holding the stylus 20. Without the at least one support 32, 34 the case 10 may be raised above the case bearing surface by the stylus 20 contacting the case bearing surface, which may generally not provide good stability. In an alternative embodiment the at least one support extends outwardly from the second face 16 for example from a lower margin 36 of the second face 16.

Figure 5:
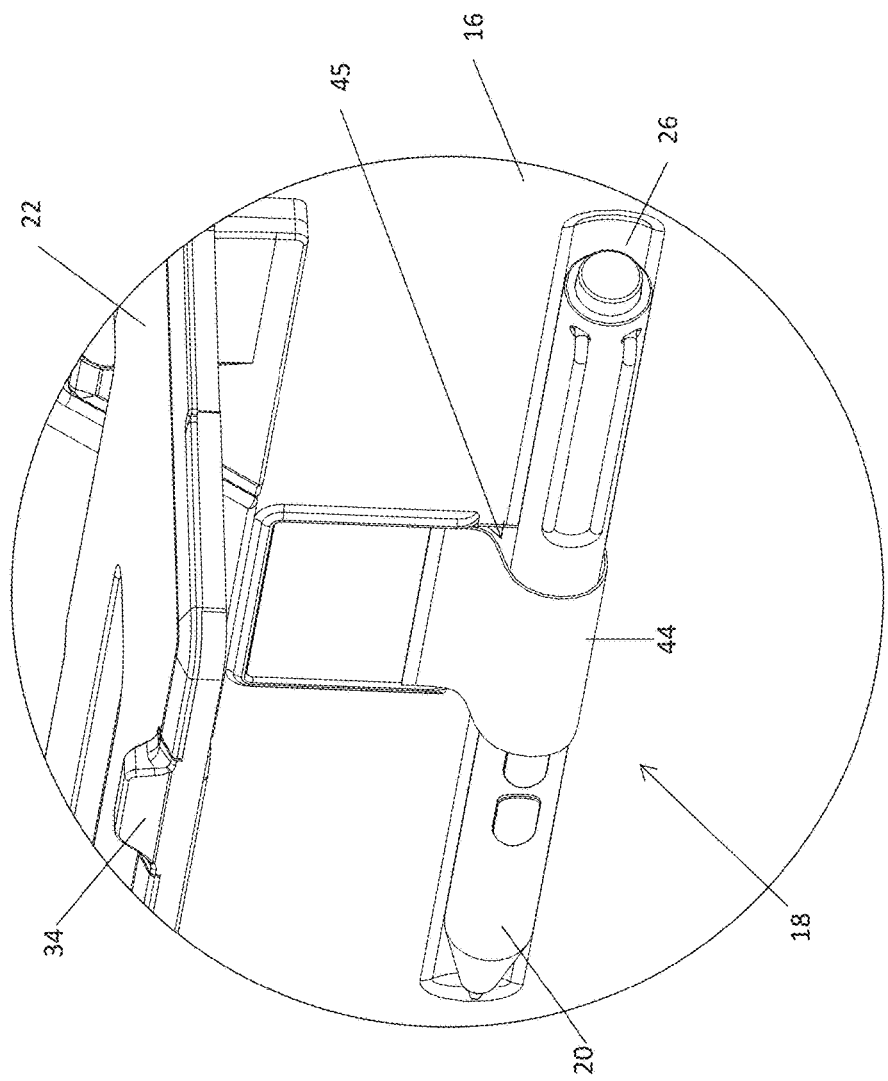
FIG. 5 shows a detail of a stylus holder of the case of FIG. 1 holding a stylus.
Figure 6:
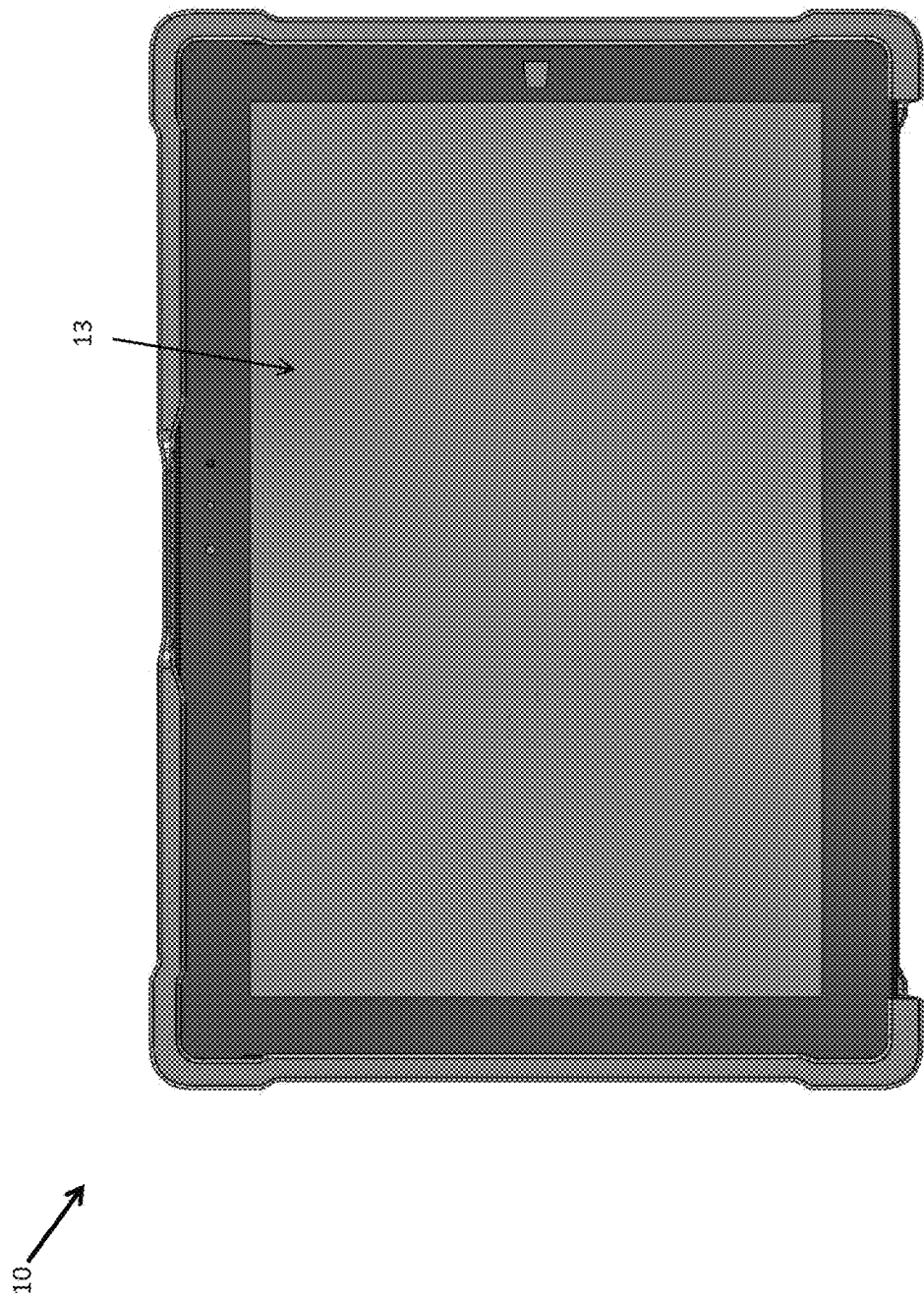
FIG. 6 shows a front elevational view of the case of FIG. 1.

As best seen in FIG. 5, the stylus holder 18 comprises a loop 44 in the form of a loop of material in the form of a loop of tape (which may be ribbon). In this embodiment the material is a woven fabric, however it may be a membrane, for example a polymer membrane or generally any suitable material. The loop 44 may alternatively comprise ridged or semi-rigid polymer or other material. The loop 44 is for receiving the stylus. The loop 44 is attached to the second face 16 adjacent the groove 26. The loop may be molded into the body for attachment, may be attached using adhesive, or attached in any suitable way. The collapsible stand 22 and the loop 44 are relatively disposed such that the loop 44 is constricted by the collapsible stand 22 when collapsed, which causes the loop to constrict around the stylus 20 when so received by the loop 44. A portion 45 in the form of an edge 45 of the collapsible stand 22 is located adjacent the groove 26 and presses the loop when the collapsible stand 22 is collapsed. This tensions the loop, and narrows the loop adjacent the groove and stylus when so received. This may improve the loop's hold on the stylus and consequently the hold of the stylus holder 18 on the stylus 20. The portion may alternatively be in the form of an arm or generally any suitable form.

The constriction may be maintained by a magnetic attraction between the collapsible stand 22 and the body 12 as described below, and which in this embodiment magnetically fastens the collapsible stand 22 to the body 12. Alternatively, the collapsible stand 22 may be clipped, strapped, or otherwise fastened to the body 12.

The body 12 comprises a ferromagnetic element 39 that is magnetically attracted to another ferromagnetic element 39 attached to the collapsible stand 22. The other ferromagnetic element 39 is, in this embodiment, within the collapsible stand 22, however it may be attached to a surface of the collapsible stand 22 in alternative embodiments. In this embodiment the second face comprises a pair of ferromagnetic elements 39 and the collapsible stand comprises another pair of ferromagnetic elements disposed for magnetic coupling with the pair of ferromagnetic elements. The ferromagnetic element 39 and the other ferromagnetic element may each comprise a rare earth magnet, an iron magnet, a strip of plastic binder having a high coercivity ferromagnetic compound, steel or iron, or generally any suitable form of magnet, magnets or material attracted to a magnet.

Generally any suitable arrangement of ferromagnetic materials may be used for the magnetic attraction between the collapsible stand and the body 12. While this embodiment comprises four magnets, other embodiments may have more or less magnets as is suitable and/or desired.

A distal edge 38 of the collapsible stand 22, a distal edge 38 of the plate 28 in this embodiment, comprises a slip-resistant material in the form of a polymeric strip. The slip-resistant material may be any suitable material, for example natural or synthetic rubber, polyurethane or silicone. The slip-resistant material may have an alternative form, for example a plurality of squares of slip-resistant material distributed along the distal edge 38. Generally the slip-resistant material might have any suitable form.

In this but not necessarily all embodiment, the body 10 has a perimeter wall 40 and a rear wall 42 (the second face 16 being a face of the rear wall 42) that protects the tablet shaped device when so received by the tablet shaped device receiving area. The perimeter wall 40 and/or the rear wall 42 may have a plurality of optional ports for cable or other access to the tablet shaped device when received.

The perimeter wall 40 has a resilient lip located at a distal end thereof. The perimeter wall 40 and the tablet shaped device receiving area define a cavity in which the tablet shaped device is held by the resilient lip. The opening of the cavity is constricted by the resilient lip. The tablet shaped device may be inserted into the cavity by squeezing it through the opening defined by the resilient lip. The resilient lip deforms to accommodate the passage of the tablet shaped device, and recoils back into shape subsequent to passage of the tablet shaped device. In another embodiment the tablet shaped device may be held to the tablet shaped device receiving area by at least one elastic strap or generally by any suitable means.

The tablet shaped device receiving area has an optional inner lining in the form of a inner felt lining. The inner lining provides a relatively soft surface to reduce scratching of the tablet shaped device. Other embodiments may not have an inner lining or may have another suitable lining material.

FIG. 7 shows an elevational view of an alternative example of a collapsible stand 56 for the case 10 for a tablet computer. The collapsible stand 56 defines a space 58 in which the stylus may be disposed when the collapsible stand is collapsed. The collapsible stand 22 may be stronger than the collapsible stand 56.

The case may be constructed from any suitable materials, including but not limited to polymers including polyurethanes and polycarbonates, and metals. Fabrication may comprise injection moulding and subsequent assembly of the parts formed thereby.

Variations and/or modifications may be made to the embodiments described without departing from the spirit or ambit of the invention. For example, the collapsible stand 22 may be attached to the peripheral wall 40. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A case for a tablet shaped device, the case comprising:
   a body comprising a first face and a second face, the first face having a tablet device receiving area;
   a stylus holder comprising a groove for receiving a stylus therein and a loop at the groove, the loop being for receiving the stylus, the groove being at the second face and distal of a lower margin of the second face; and
   a collapsible stand attached to the body, wherein the collapsible stand defines a space in which the stylus, when so held, is disposed when the collapsible stand is collapsed, wherein the collapsible stand and the loop are relatively disposed such that a portion of the collapsible stand presses the loop inwardly when the collapsible stand is collapsed to tension the loop and so hold the stylus within the groove.

2. The case of claim 1, wherein the collapsible stand has an aperture in which the stylus, when so held, is disposed when the collapsible stand is collapsed.

3. The case of claim 1, comprising at least one support configured for supporting the stylus holder above a case bearing surface.

4. The case of claim 1, wherein a distal edge of the collapsible stand comprises a slip-resistant material.

5. The case of claim 1, wherein the collapsible stand and the body are magnetically attracted to each other for fastening the collapsible stand at the second face when collapsed.

6. The case of claim 1, wherein the portion comprises an edge.

\* \* \* \* \*